(No Model.)

T. N. L. ANDERSON & W. BOATNER.
FERTILIZER DISTRIBUTER.

No. 467,074. Patented Jan. 12, 1892.

WITNESSES:
F. McArdle.
C. Sedgwick.

INVENTOR
T. N. L. Anderson
BY W. Boatner
Munn & Co.
ATTORNEYS

THE NORRIS PETERS CO., PHOTO-LITHO., WASHINGTON, D. C.

UNITED STATES PATENT OFFICE.

THADDEUS N. L. ANDERSON AND WILLIE BOATNER, OF CENTREVILLE, MISSISSIPPI.

FERTILIZER-DISTRIBUTER.

SPECIFICATION forming part of Letters Patent No. 467,074, dated January 12, 1892.

Application filed August 1, 1891. Serial No. 401,361. (No model.)

*To all whom it may concern:*

Be it known that we, THADDEUS N. L. ANDERSON and WILLIE BOATNER, of Centreville, in the county of Wilkinson and State of Mississippi, have invented a new and useful Improvement in Fertilizer - Distributers, of which the following is a full, clear, and exact description.

Our invention relates to an improved fertilizer-distributer, and has for its object to provide an implement of a simple, durable, and economic construction by means of which any fertilizing material may be conveniently and regularly distributed upon the ground while the operator is walking over the same, as the implement is adapted to be carried by the operator.

Another object of the invention is to provide a means whereby the fertilizer will be practically sifted before entering the hopper and whereby, also, the amount of fertilizing material to be distributed may be regulated and any material that may choke the hopper, above the valve may be speedily and conveniently loosened.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
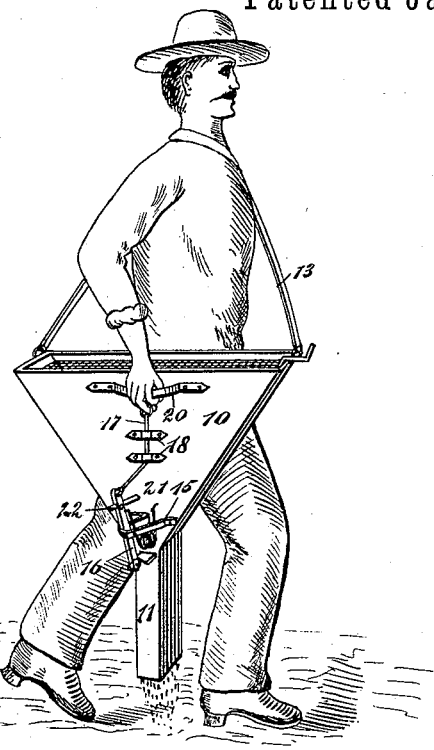
Figure 2:
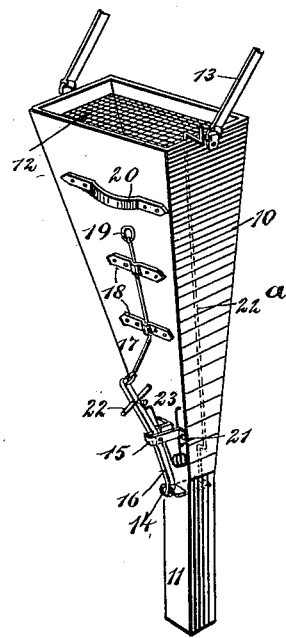

Figure 1 is a perspective view of the implement, illustrating the position it is adapted to occupy with reference to the body of the operator. Fig. 2 is a perspective view of the implement, and Fig. 3 is an enlarged view illustrating a portion of one side of the hopper.

The hopper 10 is practically V-shaped in general contour, and in its lower or contracted end is provided with a downwardly-extending spout 11. The spout is ordinarily made rectangular in cross-section and is smooth upon its interior, having communication with the hopper. The mouth of the hopper in its preferred form is rectangular, as illustrated, and slightly below the mouth within the hopper a sieve 12 is horizontally located, the fertilizing material being placed upon the sieve and forced through it into the hopper. By this means the fertilizing material to be distributed is rendered more or less fine and free from lumps. The hopper is provided with an attached strap 13 or the equivalent thereof, which, when the implement is to be used, is placed over the left shoulder of the operator, as shown in Fig. 1, whereby the hopper will hang at the right-hand side of the operator to be manipulated by the right hand.

Figure 3:
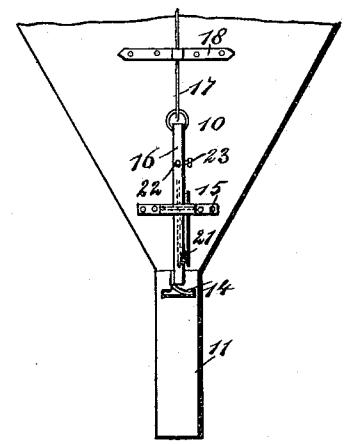

Within the spout 11 a slide-valve 14 is located, one end of which valve extends outward from the outer face of the spout, as is best shown in Figs. 2 and 3. Upon the outer face of the hopper, in a suitable horizontal bracket 15, or the equivalent thereof, a lever 16 is fulcrumed at or near its center. The lower end of this lever is attached in any approved manner to the outer end of the slide-valve 14, and the upper end of the lever is attached to a curved rod 17, held to slide in suitable guides 18, secured to the outer face of the hopper at or near its center. The rod terminates, preferably, at its upper end in a ring 19, and above this ring a strap-like handle 20 is fastened transversely upon the hopper.

Between the lever 16 and the hopper a spring 21 is interposed, the said spring being adapted to so bear upon the lever as to normally force its lower end inward and keep the valve 14 closed. The amount of material to be distributed is regulated through the medium of a gage-bar 22, which is passed through the lever 16 near its upper end in a manner to engage with the outer side face of the hopper and is held rigidly to the lever during the operation of the implement through the medium of a set-screw 23 or a like device.

It often happens that fertilizing material, especially when damp, will form solidly above the valve or in the mouth of the spout 11 and refuse to drop from said spout when the valve is open. It is therefore necessary that some provision should be made to loosen and dislodge the compact mass. This we accomplish through the medium of a stirrer-rod 22ª, which is journaled in any suitable or approved manner at one end of the hopper, extending downward to a point immediately over the valve and upward above the upper end of the hopper. The upper end of this rod is shaped as a crank, and the lower end is rendered more or less zigzag or angular, as is illustrated in Fig. 2. By turning the rod through the medium of this crank the lower end is forced through the fertilizing material, thoroughly loosens the same, and forces it to drop properly when the valve is opened. The stirrer-rod is manipulated by the left hand of the operator, and in the operation of distributing the fertilizer, when the implement is in position upon the operator, the right hand of the operator grasps the strap-like handle 20, thus taking some of the weight of the implement from the shoulders, and a convenient finger of the right hand is passed through the ring of the lift-rod 17, chain, rope, or whatever device may be connected with the top of the lever 16, the gage-rod 22 having been previously set to permit the valve to open a predetermined distance only.

As the operator walks over the field or ground to be fertilized, whenever the material is to be dropped he draws upward upon the rod 17, thus drawing inward the upper end of the lever 16, compressing the spring 21, and throwing out the lower end of the lever, thereby opening the valve 14. The opening in the spout disclosed by the valve cannot be increased in area unless the gage-rod 22 engages with the hopper; and said gage-rod may be provided with a scale permitting the valve to be set to distribute a predetermined amount to the acre.

Having thus described our invention, we claim as new and desire to secure by Letters Patent—

1. In a fertilizer-distributer, the combination, with a hopper provided with a spout at its lower end, a screen located in the top of the hopper, and a slide-valve located near the junction of the hopper with its spout, of a spring-pressed lever attached at one end to the slide-valve, and a lifting device connected with the upper end of the lever, whereby the slide-valve is opened when the said device is drawn upward, as and for the purpose specified.

2. In a fertilizer-distributer, the combination, with a hopper provided with an attached spout and a horizontal slide-valve located near the junction of the hopper and spout, of a spring-pressed lever secured at its lower end to said valve and fulcrumed upon the outer face of the hopper, the curved lifting-rod 17, sliding in keepers on the side of said hopper, and the gage-bar 22, attached adjustably to and carried by the lever and adapted for engagement with the hopper, as shown and described.

3. In a fertilizer-distributer, the combination, with a hopper provided with a spout at one end, a screen located near the upper end of the hopper, a slide-valve located near the junction of the spout and hopper, and a stirrer-rod journaled in the hopper and extending downward over to a point beyond the slide-valve, of a spring-pressed lever fulcrumed upon the outer face of the hopper, the lower end of said lever being connected with the slide-valve, a lift-rod capable of vertical movement attached to the upper end of the lever and terminating in a ring-like handle, a handle attached to the hopper above the lift-rod, and a gage-bar adjustably secured to the lever and limiting the outward throw of the slide-valve, as and for the purpose specified.

THADDEUS N. L. ANDERSON.
WILLIE BOATNER.

Witnesses:
ANTHONY FLY,
W. F. STOVALL.